No. 12,263. REISSUED AUG. 23, 1904.

L. T. HOUGHTON.

THREAD GUIDE SUPPORT FOR SPINNING OR TWISTING MACHINES.

APPLICATION FILED JULY 16, 1904.

Witnesses:
E. F. Mesard.
M. E. Regan.

Inventor:
L. T. Houghton.
By his Attorneys,
Southgate & Southgate

No. 12,263. Reissued August 23, 1904.

UNITED STATES PATENT OFFICE.

LEWIS T. HOUGHTON, OF WORCESTER, MASSACHUSETTS.

THREAD-GUIDE SUPPORT FOR SPINNING OR TWISTING MACHINES.

SPECIFICATION forming part of Reissued Letters Patent No. 12,263, dated August 23, 1904.

Original No. 753,577, dated March 1, 1904. Application for reissue filed July 16, 1904. Serial No. 216,914.

*To all whom it may concern:*

Be it known that I, LEWIS T. HOUGHTON, a citizen of the United States, residing at Worcester, in the county of Worcester and State of Massachusetts, have invented a new and useful Thread-Guide Support for Spinning or Twisting Machines, of which the following is a specification.

This invention relates to an improved thread-guide for spinning or twisting machines and to an improved form of thread-guide support.

The objects of this invention are to provide a form of thread-guide which may have a hard temper imparted thereto without rendering the same liable to break or crack when in use and to provide a strong, simple, inexpensive, and durable thread-guide support which may be readily cleaned or wiped off, which will be free from cracks or crevices in which dust can lodge, and which is especially designed to be struck up from sheet metal.

To these ends this invention consists of the thread-guide, the thread-guide support, and the combinations of parts, as hereinafter described, and more particularly pointed out in the claims at the end of this specification.

Figure 1:
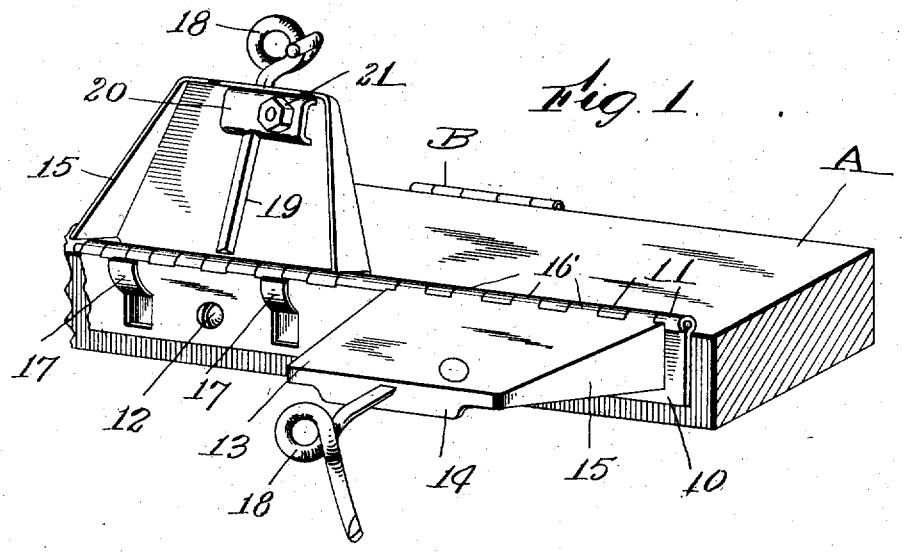
Figure 2:
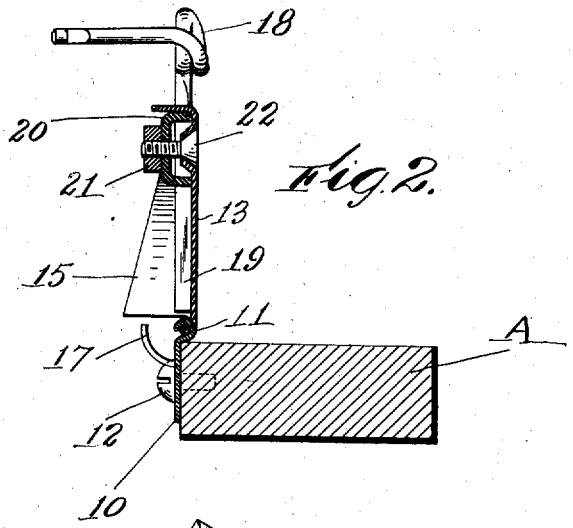
Figure 3:
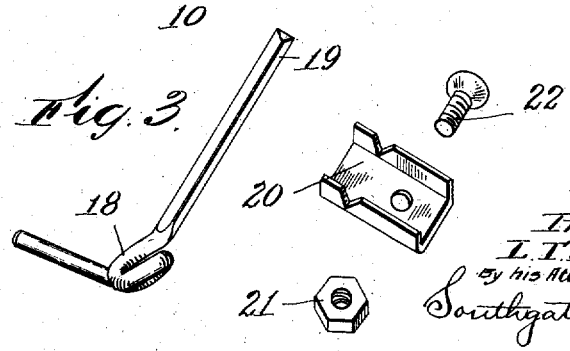

In the accompanying drawings, Figure 1 is a perspective view illustrating the preferred form of construction for carrying out this invention. Fig. 2 is a transverse sectional view of the same, and Fig. 3 is a perspective view of a thread-guide and of the parts for clamping the same in place.

In a previous patent granted to me July 9, 1901, No. 677,988, I have shown and claimed a sheet-metal support for a thread-guide of a spinning or twisting machine; and the especial object of the present invention is to perfect and improve the construction shown in my aforesaid patent and to adapt sheet-metal thread-guides of my invention for use in connection with the ordinary wooden or other strips employed to form the finger-head boards of spinning or twisting machines. I accomplish this last-named object by hinging the finger-heads to a sheet-metal strip. This sheet-metal strip is comparatively light and easily handled and may be made up in pieces of such length as to be conveniently punched, so that the use of this supplemental strip forms, in effect, a convenient way of gaging and setting a number of finger-heads in proper position at one operation.

Referring to the accompanying drawings and in detail, A designates a wooden strip which may be hinged to the frame of a spinning or twisting machine by means of ordinary hinges B, as is now the usual practice.

Fastened onto the front of the wooden piece A is a sheet-metal strip 10, which may be held in place by means of screws 12. Along its upper edge the strip 10 is provided with integral fingers or projections 11, which are bent back and rolled or turned to form a socket for receiving the rod or wire which forms the hinge-pin of the several finger-heads, as hereinafter described. The punching or cutting of the strip 10 provides a strip 10 with places for receiving the finger-heads, so that the finger-heads will be accurately gaged or spaced, and a number of finger-heads hinged to their strip may be handled as a single unit in equipping a spinning or twisting machine according to this invention. In all cases it may not be necessary to turn or bend back the fingers 11 before rolling the same to form the hinge-pin socket. In practice, however, I prefer to bend said tongues in this manner in order to form an angle or shoulder for setting the strip 10 in proper position on the front edge of the wooden finger-head board A. Furthermore, by applying the strip 10 to the front of the wooden finger-head board A, I have found in practice that this strip will strengthen and prevent the wooden finger-head board from warping or twisting out of shape, the two parts as thus combined forming an efficient supporting-piece for the finger-heads. The sheet-metal strip 10, as before explained, simplifies the setting of the thread-guide to proper position, as by means of this strip a number of thread-boards may be properly gaged and fastened in position at one operation. The finger-heads, as herein illustrated, are each stamped out of a single piece of sheet metal, so as to form a plate or body portion 13, having a depending front flange 14 and side flanges or bent-down portions 15. At its rear edge each finger-head is provided with rearwardly-extending integral tongues 16, which are bent down or coiled upon themselves to form a socket for the hinge-pin, which is below the level of the upper surface of the finger-head. In practice I have found this to be a desirable feature of construction, as the joints of the finger-heads will be located below their upper surfaces, leaving the rear edge of each finger-head entirely unobstructed, so that dirt or dust collecting thereon can be pushed back or readily wiped therefrom.

In the construction herein illustrated the side flanges 15 of each finger-head form stops for holding the finger-head in its normal horizontal position. In some cases, however, it may be desirable to provide other stops for this purpose, and to accomplish this the strip 10 may have fingers or sections 17 cut therefrom, such sections or fingers 17 being preferably turned or bent up from the sheet-metal strip 10, as illustrated in Fig. 1. The stops 17 as thus constructed may be employed in addition to the side flanges 15 for holding the finger-heads horizontal or may be used in place of said side flanges when it is desired to employ a less amount of metal in each of the finger-heads.

The form of thread-guide which I preferably employ and the construction for clamping each thread-guide in place are most clearly illustrated in Figs. 2 and 3. As shown in these figures, each thread-guide 18 is provided with a shank 19 of triangular or other uniform non-circular cross-section, and in practice I have found that this form of thread-guide can be rendered more reliable in actual use than the ordinary forms of thread-guides, in which screw-threaded shanks have heretofore ordinarily been employed. This is due to the fact that if a hard temper is imparted to a thread-guide having a screw-threaded shank the screw-threads are apt to weaken the shank to such a degree as to render the same quite brittle and liable to be broken, whereas in the form of thread-guide which I have herein illustrated I have found in practice that the thread-guides may be very highly tempered without rendering the same liable to crack or break off.

To clamp each thread-guide in its adjusted position, I preferably employ a clamping-piece substantially U-shaped in cross-section, the flanges or edges of which are notched to correspond to the triangular shape of the thread-guide shank. Extending down through each clamping-piece 20 is a blank-headed screw 22, threaded onto the end of which is a nut 21. The head of the screw 22 fits down into an integral socket struck down from the top plate of the finger-head board, and to hold the screw from turning the head of the screw may be provided with small wings or projections, as illustrated in Fig. 3. By means of this construction it will be seen that the smooth head of the screw is brought down flush with the surface of the finger-head, so as to retain a smooth uninterrupted face over the entire upper surface of the finger-head.

I am aware that numerous changes may be made in the construction of my thread-guide and its support by those who are skilled in the art without departing from the scope of my invention as expressed in the claims. In this application for patent, however, I do not claim the combination of a sheet-metal strip or finger-head board with a finger-head having top and side flanges stamped from a single piece of sheet metal and having integral sections at its rear edge bent or turned to form a socket for receiving the hinge-pin, which connects the finger-head to the finger-head board, with the side flanges of the finger-head forming stops for holding the finger-head horizontal, as I have claimed this subject-matter in my prior patent before referred to; but What I do claim, and desire to secure by Letters Patent of the United States, is—

1. In a spinning or twisting machine, the combination of a sheet-metal strip having places stamped therein for setting finger-heads, with the finger-heads hinged to said strip so that the thread-guides of the finger-heads will be in proper position when the strip is fastened in place in the machine.

2. In a spinning or twisting machine, the combination of a rail or supporting-board with a vertical sheet-metal strip secured to the front face thereof, said sheet-metal strip having places stamped therein for setting the finger-heads, and with the finger-heads hinged to the sheet-metal strip and extending horizontally therefrom.

3. In a thread-guide support for spinning or twisting machines, the combination of a rail or supporting-piece, and a plurality of sheet-metal finger-heads, each formed from a piece of sheet metal bent to form a top plate, and bent-down portions which engage the vertical face of the rail or supporting-piece forming stops for holding the finger-heads in horizontal position.

4. In a thread-guide support for spinning or twisting machines, the combination of a sheet-metal strip and a plurality of sheet-metal finger-heads, each formed from a piece of sheet metal bent to form a top plate, side flanges which act as stops for holding the finger-heads in horizontal position, and integrally bent or turned tongues which intermesh with bent or turned tongues extending from the sheet-metal strip to form hinged joints.

5. As an article of manufacture, a thread-guide for spinning or twisting machines consisting of hard-tempered steel wire having a thread-receiving eye with a fastening-shank extending therefrom which is non-circular in cross-section and which is of a uniform size throughout its length so as to be free from nicks or notches forming points at which the shank may be fractured or broken.

6. The combination of a sheet-metal finger-head, a thread-guide having a shank of uniform non-circular cross-section, a clamping-piece notched to receive the shank of the thread-guide, and a clamping-screw fitting into a socket struck down in the finger-head, so that the surface of said screw is substantially flush with the surface of the finger-head, substantially as described.

7. The combination of a finger-head board, a finger-head consisting of a sheet-metal plate having integral front and side flanges, and having rearwardly-extending tongues or projections which are bent down and rolled or coiled to form a hinge-pin socket below the surface of the finger-head, a thread-guide having a triangular shank extending through the front flange of the finger-head, and clamping devices for the thread-guide, comprising a clamp-piece U shape in cross-section, having notches in its side flanges to receive the shank of the thread-guide, a smooth-headed screw fitting into a struck-down socket in the finger-head and having means for preventing the same from turning therein, and a clamping-nut threaded onto the lower end of said screw, substantially as described.

In testimony whereof I have hereunto set my hand in the presence of two subscribing witnesses.

LEWIS T. HOUGHTON.

Witnesses:

PHILIP W. SOUTHGATE,

MARY E. REGAN.